United States Patent [19]

Kinoshita et al.

[11] Patent Number: 5,039,734
[45] Date of Patent: Aug. 13, 1991

[54] MACROMOLECULAR AZO COMPOUND, PROCESS FOR PRODUCING SAID COMPOUND, AND RESIN OBTAINED BY USING SAID COMPOUND

[75] Inventors: Hiroshi Kinoshita, Suita; Goro Iwamura, Sakai, both of Japan

[73] Assignee: Dainippon Ink and Chemicals, Inc., Tokyo, Japan

[21] Appl. No.: 556,439

[22] Filed: Jul. 24, 1990

[30] Foreign Application Priority Data

Aug. 17, 1989 [JP] Japan ................................. 1-210741

[51] Int. Cl.$^5$ .............................................. C08L 75/04
[52] U.S. Cl. .................................... 524/715; 525/123; 525/131; 528/85; 534/591; 534/732; 534/886
[58] Field of Search ................ 524/715; 525/123, 131; 528/85; 534/591, 732, 886

[56] References Cited

U.S. PATENT DOCUMENTS

| | | | |
|---|---|---|---|
| 3,909,497 | 9/1975 | Hendry et al. | 149/19 |
| 4,288,577 | 9/1981 | McShane | 528/85 |
| 4,751,254 | 6/1988 | Kluger et al. | 521/163 |

FOREIGN PATENT DOCUMENTS 1803339  6/1969  Fed. Rep. of Germany .
2426172 12/1975  Fed. Rep. of Germany .

OTHER PUBLICATIONS

Journal of Applied Polymer Science, "Preparation of Block Copolymers with Polymeric Azocarbamate as an Initiator", vol. 31, pp. 2171-2183, (1986).
American Chemical Society, "Degradable Polymers . . . ", vol. 18, pp. 127-131 (1985).

*Primary Examiner*—Maurice J. Welsh
*Attorney, Agent, or Firm*—Sherman and Shalloway

[57] ABSTRACT

A macromolecular azo compound is produced by the reaction of a compound having at least 1 diazo linkage and at least 2 hydroxyl groups in a molecule, a compound having at least 2 isocyanate groups in a molecule and a compound having at least 2 hydroxyl groups in a molecule. A resin useful as a paint can be obtained by polymerizing a polymerizable unsaturated bond-containing monomer in the presence of this compound.

15 Claims, No Drawings

MACROMOLECULAR AZO COMPOUND, PROCESS FOR PRODUCING SAID COMPOUND, AND RESIN OBTAINED BY USING SAID COMPOUND

This invention relates to a novel useful macromolecular azo compound, a process for producing said compound, a resin obtained by using said compound and the use of said resin. More specifically, this invention relates to a specific macromolecular polyazo compound having a diazo linkage and an urethane linkage in a main chain, a process for producing such specific macromolecular azo compound, a specific block copolymer resin obtained by polymerizing a polymerizable unsaturated bond-containing compound in the presence of such specific macromolecular compound, and the use of such specific block copolymer resin as a paint in particular.

The resin of this invention exhibits epochal effects in the fields requiring hardness and weatherability of vinyl copolymers, above all, acrylic resins, pigment dispersibility of polyurethane resins and properties of coated films.

As is well known, a one-can resin having a polyurethane linkage in a main chain shows strong adhesion to a material to which the usual acrylic resins never adhere, such as nylon. The resin of this invention exhibits also epochal effects to this field.

The resin of this invention moreover exhibits, besides such adhesion to plastics, unique effects in the use requiring opposite properties, hardness and flexibility, e.g. as a resin for paint in accordance with JIS K-6910, requiring elongation at low temperatures in winter, etc. and stain resistance at high temperatures in summer, etc.

By the way, since the acrylic resin is not compatible at all with the polyurethane resin, a blend of those polymers is poor in gloss and extremely poor in storage stability.

Accordingly, a great many studies have been made about a method to introduce in the polymers components different from said incompatible polymers.

One of them is a method in which a graft copolymer is obtained by adding maleic anhydride, etc. to a polyurethane resin terminated by a hydroxyl group to introduce a polymerizable unsaturated bond, and then copolymerizing this with a vinyl monomer. However, a problem remains unsolved that as this method cannot introduce an urethane linkage in the main chain of the polymer, not so great an improvement in performance can be expected.

It is also possible that an acrylic monomer is polymerized in the presence of an azo initiator terminated by a hydroxyl group, such as azobiscyanopentanol, and the resulting acrylic resin with the hydroxyl group introduced in the end is rendered macromolecular-weight by a diisocyanate compound. This method however has drawbacks that solubility of the azo initiator in the solvent is poor and a rate at which to introduce a functional group in the end is low depending on efficiency of the initiator.

There is the other drawback that though in a paint based on a macromolecular polyurethane resin said resin itself has good properties, its solubility in a solvent is insufficient because of the high molecular weight and the high hydrogen bond strength, and coatability is therefore poor.

Moreover, various studies have been made before on synthesis of a block copolymer utilizing a so-called macromolecular azo initiator which is the same as the resin in this invention. Examples thereof are "KOBUNSHI RONBUNSHU", Ueda, et al., vol. 33, No. 131 (1976) and "J. Polym. Sci. Polym. Chem. Ed.", vol. 22, p. 1611 (1986). These proposals are however only such that a polyester-type macromolecular azo initiator is synthesized by using azobiscyanopentanoic acid chloride and various block copolymers are obtained in the presence of such initiator. Moreover, a method to synthesize a macromolecular azo initiator itself by using the specific azoalcohol compound in the above documents is disclosed in "Angew. Makromol. Chem.", Furukawa, et al., vol. 1, No. 92 (1967) and "J. Appl. Polym. Sci.", Yuriik, et al, vol. 31, p. 2171 (1986). However, these proposals are only that a diisocyanate is used to couple a polyether diol with azobiscyanopentanol for obtaining the macromolecular azo initiator having a polyether main chain.

In that respect, this invention is based on a block copolymer of a quite new structure that cannot be obtained in the prior art.

In view of the above drawbacks found in forming the macromolecular polyurethane resin into a paint and the above various drawbacks in the various prior techniques, the present inventors have made extensive studies to develop the resin in the aforesaid fields, and consequently discovered that a polymer having a polyurethane linkage in a main chain is block-copolymerized with an acrylic resin to thereby provide a new resin having both the excellent properties inherent in the polyurethane resin and the excellent properties inherent in the acrylic resin.

This invention thus has the subjects to provide a new macromolecular azo compound, a process for producing said compound, and a quite unique block copolymer resin using such new macromolecular azo compound, as well as a quite useful resin for paint that gives a tough, elastic coated film having excellent pigment dispersibility.

In view of the aforesaid subjects, the present inventors, for obtaining a unique polyurethane-acrylic resin block copolymer having the properties of both the polyurethane resin and the acrylic resin, have first synthesized a so-called polyurethane polyazo compound having a specific molecular weight and a specific concentration of an urethane linkage by reacting, for example, a compound having at least 1 diazo linkage and at least 2 hydroxyl groups in a molecule with a polyisocyanate compound, and then polymerized a polymerizable unsaturated bond-containing monomer in the presence of such specific polyurethane azo compound. Consequently, they have found that a new block copolymer, e.g. an acrylic resin-polyurethane block copolymer having well-balanced properties in pigment dispersibility, stain resistance, hardness, elongation, adhesion, low-temperature flexibility, weatherability and dryability is obtained in comparison to a graft copolymer, a random copolymer, a block copolymer and a polyurethane-acrylic resin blend obtained by the aforesaid prior methods, and that such specific block copolymer is a quite useful resin for paint.

This invention thus provides a macromolecular azo compound obtained by the addition reaction of a compound having at least 1 diazo linkage and at least 2 hydroxyl groups in a molecule, a compound having at least 2 isocyanate groups in a molecule and a compound having at least 2 hydroxyl groups in a molecule, above all, a compound (hereinafter referred to as a "macromolecular azo initiator") having in a molecule at least one structural unit represented by formula

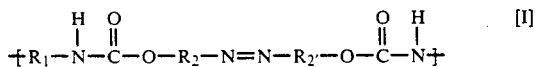

$$\text{\textlbrackdbl} R_1-N-C-O-R_2-N=N-R_{2'}-O-C-N \text{\textrbrackdbl} \quad [I]$$

wherein $R_1$ denotes an alkylene group or an alkylene group containing a benzene ring or a cyclohexane ring, $R_2$ and $R_{2'}$ may be the same or different and each denotes an alkylene group, a cyano group-containing alkylene group, an amide linkage-containing alkylene group or an alkylene group containing an amide linkage and a hydroxyl group, and at least one structural unit represented by formula

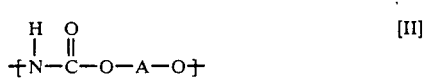

$$\text{\textlbrackdbl} N-C-O-A-O \text{\textrbrackdbl} \quad [II]$$

wherein —O—A—O— denotes a polyurethane polyol residue in which A denotes a polyurethane chain, and a concentration of the urethane linkage in the polyurethane chain A is 0.001 to 0.009 mol/g, and a process for producing said compound by using the aforesaid starting materials.

This invention further provides a block copolymer resin excellent in dryability, hardness, elongation and stain resistance by polymerizing a polymerizable unsaturated bond-containing monomer in the presence of the thus obtained specific macromolecular azo initiator.

The aforesaid so-called macromolecular azo initiator having at least 1 diazo linkage and at least 2 hydroxyl groups in a molecule and having a number-average molecular weight of 1,500 to 50,000 is a compound having the specific structural units represented by the above formulas [I] and [II], and is obtained by the reaction of a compound having at least 1 diazo linkage and at least 2 hydroxyl groups in a molecule, such as an azobisalkanol, e.g. azobiscyanopropanol, azobiscyano-n-butanol or azobisisobutanol, or an azoamidepolyol, e.g. VA-1080, VA-082 or VA-086 (a tradename for a product of Wako Junyaku Kogyo K.K.), a polyisocyanate compound and a polyol compound.

Namely, such polyurethane-type macromolecular azo initiator is formed by the addition condensation reaction of the three components, i.e. a diisocyanate such as isophorone diisocyanate, methylcyclohexane-2,4-diisocyanate, methylcyclohexane-2,6-diisocyanate, 4,4'-methylenebis(cyclohexylisocyanate), 1,3-di(isocyanatemethyl)cyclohexane, tetramethylene diisocyanate, hexamethylene diisocyanate, trimethylcyclohexane diisocyanate, tolylene diisocyanate or xylene diisocyanate, or a polyisocyanate compound such as an addition product of the above diisocyanate and a polyhydric alcohol, e.g. glycerol, trimethylolethane, trimethylolpropane, pentaerythritol or dipentaerythritol or a polyester compound of a very low molecular weight having a number-average molecular weight of e.g. about 500 to 1,500 and containing a functional group capable of reacting with the isocyanate group; a diol or a polyol such as ethylene glycol, diethylene glycol, propylene glycol, dipropylene glycol, 1,4-butanediol, 1,3-butanediol, 1,6-hexanediol, 3-methyl-1,5-pentanediol, neopentylglycol, cyclohexanedimethanol, dimethylolpropionic acid, polyethylene glycol having a number-average molecular weight of up to about 1,500, polypropylene glycol, polyhexamethylene glycol, trimethylolethane, trimethylolpropane, glycerol, pentaerythritol, hydrogenated bisphenol A, or bisphenol A or a polyester polyol having a number-average molecular weight of up to about 1,500; and the compound having at least 1 diazo linkage and at least 2 hydroxyl groups in a molecule.

The number-average molecular weight of the above diol or polyol compound is up to 1,500 from the aspect of the reactivity, and preferably up to 1,000.

Typical examples of the polyester polyol having the number-average molecular weight of up to 1,500 include hydroxyl group-containing polyester resins (including oil-modified ones) obtained by dehydrocondensation of the aforesaid diol and polyol compounds, and hydroxyl group-containing polyester resins obtained by ring opening polymerization of various lactone compounds such as epsilon-caprolactone and valerolactone. They are obtained by a usual reaction process.

Examples of the process are a process in which the above three components are charged at the same time and the reaction is run, and a process in which an isocyanate group-containing polyurethane intermediate (i.e. a so-called a urethane prepolymer) is first prepared and then reacted with a compound having at least 1 diazo linkage and at least 2 hydroxyl groups in a molecule. The process is however not particularly limited.

Incidentally, in the reaction between the diol or polyol compound and the diisocyanate or polyisocyanate compound, a chain extender may of course be used. Examples of the chain extender are polyamine compounds such as ethylenediamine, hexamethylenediamine, triethylenetetramine, tetraethylenepentamine, bisaminopropylamine and 4-aminomethyl-1,8-diaminooctane.

In the polyurethane-type macromolecular azo initiator, the amount of the urethane linkage is significant. That is, the suitable amount of the urethane linkage in the polyurethane polyol moiety in the above formula [II] is 0.001 to 0.009 mol/g. When the amount is less than 0.001 mol/g, it is hard to obtain a final block copolymer having sufficiently both the properties of the polyurethane and acrylic resins. When the amount is more than 0.009 mol/g, crystallinity goes too high and solubility of the macromolecular azo initiator becomes poor. Either case is thus unwanted. More preferable is 0.001 to 0.007 mol/g.

The number-average molecular weight of the polyurethane-type macromolecular azo initiator, i.e. the compound having the structural units of formulas [I] and [II] and containing the urethane linkage and the diazo linkage is 1,500 to 50,000, preferably 2,000 to 25,000 because it shows especially good solubility in the polymerizable unsaturated bond-containing monomer and solvent which will be later described. When it is less than 1,500, a rate at which to introduce the diazo linkage becomes low, making it impossible to exhibit performance of a coated film which is one of the characteristics of the resin in this invention. When it exceeds 50,000, solubility in the solvent goes poor and therefore uniform block copolymerization cannot be conducted. Thus, either case is unwanted.

Typical examples of the polymerizable unsaturated bond-containing monomer used in the block copolymerization reaction in the presence of the macromolecular azo initiator include (meth)acrylates such as methyl (meth)acrylate, ethyl (meth)acrylate, butyl (meth)acrylate, 2-ethylhexyl (meth)acrylate, lauryl (meth)acrylate, stearyl (meth)acrylate, cyclohexyl (meth)acrylate and benzyl (meth)acrylate; aromatic vinyl monomers such as styrene, alpha-methylstyrene and vinyltoluene; amide linkage-containing vinyl monomers such as (meth)acrylamide and N-methoxymethyl(meth)acrylamide; aliphatic vinyl esters such as (meth)acrylonitrile, vinyl acetate and "Veova" (a tradename for a branched aliphatic acid vinyl ester of Shell, Holland); hydroxyl group-containing vinyl monomers such as hydroxyethyl (meth)acrylate, hydroxypropyl (meth)acrylate and hydroxybutyl (meth)acrylate; carboxyl group-containing vinyl monomers (meth)acrylic acid, crotonic acid, maleic acid, fumaric acid and itaconic acid; epoxy group-containing vinyl monomers such as glycidyl (meth)acrylate and betamethylglycidyl (meth)acrylate; diesters of unsaturated dicarboxylic acids such as maleic acid and fumaric acid and $C_1$-$C_{18}$ monohydric alcohols; and vinyl fluoride monomers such as tetrafluoroethylene and hexafluoropropylene.

Such monomers may be used either singly or in combination. For obtaining the resin for paint having good performance of the coated film, the conjoint use of two or more monomers is required.

The reaction of block-polymerizing the polymerizable unsaturated bond-containing monomer in the presence of the above macromolecular azo initiator may be carried out in a usual manner. That is, various polymerization methods are employable; a solution radical polymerization method is preferable. The suitable polymerization temperature is 60° to 140° C. The suitable polymerization time is about 6 to 20 hours.

The solution radical polymerization can be conducted in an organic solvent. Examples of the organic solvent include aromatic hydrocarbons such as toluene and xylene; aliphatic or alicyclic hydrocarbons such as cyclohexane, methylcyclohexane, n-hexane and octane; esters such as methyl acetate, ethyl acetate, n-butyl acetate and amyl acetate; ketones such as acetone, methyl ethyl ketone, methyl isobutyl ketone and cyclohexanone; nitrogen-containing compounds such as N-methylpyrrolidone and dimethylformamide; and alcohols such as methanol, ethanol and n-butanol. If required, a known radical polymerization initiator can be used in said polymerization conjointly with the compound containing the structural units of the above formulas [I] and [II] and having the number-average molecular weight of 1,500 to 50,000. Examples of the known radical polymerization initiator are known azo compounds typified by azobisisobutyronitrile and known peroxide compounds typified by benzyl peroxide. If required, a known chain transfer agent typified by lauryl mercaptan, octyl mercaptan, 2-mercaptoethanol or thioglycolic acid can be used in said polymerization as a molecular weight regulator.

In performing such polymerization reaction, the amount of the macromolecular azo initiator is 2 to 95% by weight, preferably 5 to 50% by weight, and the amount of the polymerizable unsaturated bond-containing monomer is 98 to 5% by weight, preferably 95 to 50% by weight.

The amount of the macromolecular azo initiator greatly influences the performance of the coated film made by the resin of this invention. When it is less than 2% by weight, the sufficient performance of the coated film cannot be provided no matter how the composition of the polymerizable monomer is changed. Meanwhile, when it exceeds 95% by weight, the polyurethane polyol and the polyester polyol making up the initiator are less soluble in the solvent, causing turbidity and making the content of the azo linkage too high; consequently, the molecular weight of the block copolymer portion based on the polymerizable monomer cannot be increased and this results in notably decreasing dryability and low-temperature flexibility of the coated film. This is therefore undesirable. Besides, when the amount of the initiator exceeds 95% by weight, coupling (recoupling) of the initiators occurs and they do not serve as polymerization initiators, so that large amounts of polyurethane polyol and polyester polyol in which the copolymer portion based on the polymerizable monomer is not introduced at all come to exist in the system and a clear coated film cannot be provided.

The macromolecular azo compound of this invention thus acts as an initiator for obtaining a copolymer resin by polymerizing a polymerizable unsaturated bond-containing monomer in the presence of said compound, and the block copolymer resin of this invention is provided consequently. It can therefore be said as a quite useful compound.

Moreover, the thus obtained resin of this invention has excellent pigment dispersibility and provides a tough, elastic coated film. Accordingly, when the resin of this invention is used for exterior cladding of building, plastic coating, wood coating or metal coating, a coated film excellent in dryability, hardness, outdoor stain resistance, low-temperature flexibility and adhesion can be afforded.

The following Examples, Comparative Examples, Application Examples and Comparative Application Examples illustrate this invention more specifically. In said Examples, parts and percentages are all by weight unless otherwise indicated.

Examples 1 to 10 are examples of producing the macromolecular azo initiator of this invention, Examples 11 to 20 are examples of producing the resin of this invention, and Comparative Examples 1 and 2 are examples of producing a control resin.

EXAMPLE 1

A four-necked flask fitted with a thermometer, a stirrer and a reflux condenser was charged with 1,500 parts of methyl ethyl ketone, 424 parts of dipropylene glycol and 0.1 part of di-n-butyltin dilaurate. After the temperature was elevated to 80° C., 532 parts of hexamethylene diisocyanate was added dropwise with stirring over the course of 2 hours. While keeping the temperature at 80° C. for 5 hours, the reaction continued.

The resulting polyisocyanate group-containing polyurethane had a number-average molecular weight, calculated as polystyrene, of 3,700 measured by gel -permeation chromatography (GPC). In this case, said polyurethane was subjected to measurement by GPC after the treatment of reacting the isocyanate group with diethylamine.

The concentration of the urethane linkage in said polyurethane was 0.0064 mol/g.

Subsequently, the same reaction vessel as above was charged with 2,500 parts of the isocyanate group-containing polyurethane, and 44 parts of azobisisopropanol was added to the polyurethane under ice cooling. The temperature was then raised to 30° C. While keeping said temperature for 10 hours, the reaction was conducted.

The thus obtained polyurethane macromolecular azo initiator had the number-average molecular weight of 22,500, and was found to be a polyurethane macromolecular azo initiator having on the average 6.1 diazo linkages in a molecule.

This initiator solution had the nonvolatile content of 40% and the Gardner viscosity at 25° C. of $Z_1$.

EXAMPLE 2

The same reaction vessel as in Example 1 was charged with 1,500 parts of methyl ethyl ketone, 46 parts of azobiscyanopropanol and 0.2 part of di-n-butyltin dilaurate. With stirring and under ice cooling, 552 parts of hexamethylene diisocyanate was added dropwise over the course of 2 hours, and the temperature was then raised to 20° C. While keeping said temperature for 2 hours, the reaction continued. Ice cooling was then conducted again.

Subsequently, 347 parts of dipropylene glycol and 55 parts of 3-methyl-1,5-pentanediol were added and the temperature was raised to 30° C. While keeping said temperature for 10 hours, the reaction continued.

The resulting polyurethane macromolecular azo initiator had the number-average molecular weight of 18,500, the viscosity of Y-Z and the nonvolatile content of 40%.

In order to measure the other properties of the macromolecular azo initiator, 1.0 part of hydroquinone and 20 parts of n-butanol were added to 20 parts of said initiator. Heating continued at 100° C. for 10 hours to decompose the initiator.

The number-average molecular weight of the resulting decomposed product was 4,100. It was therefore found that the content of the urethane linkage in the polyurethane segment was 0.0067 mol/g and the macromolecular azo initiator had on the average 4.5 diazo linkages in a molecule.

EXAMPLE 3

A reaction vessel fitted with a thermometer, a stirrer and an air condenser was charged with 614 parts of adipic acid, 438 parts of neopentyl glycol and 698 parts of isophthalic acid, and the reaction was run at 140° C. for 1 hour. The temperature was then progressively raised to 220° C. over the course of 2 hours. The reaction was conducted at the same temperature for 6 hours to obtain a polyester resin having the acid value of 2, the hydroxyl value of 78 and the number-average molecular weight of 1,400.

Subsequently, the same reaction vessel as in Example 1 was charged with 837 parts of the above polyester resin, 27 parts of azobiscyanopropanol, 0.1 part of di-n-butyltin dilaurate and 1,500 parts of methyl ethyl ketone. Under ice cooling, 134 parts of hexamethylene diisocyanate was added dropwise over the course of 2 hours.

After the above addition, the temperature was raised to 30° C. While keeping the same temperature for 10 hours, the reaction continued. There resulted a solution of a polyurethane macromolecular azo initiator having the number-average molecular weight of 28,000, the viscosity of W-X and the nonvolatile content of 40%.

To 20 parts of the polyurethane macromolecular azo initiator were added 1.0 part of hydroquinone and 20 parts of n-butanol. The mixture was heated at 100° C. for 10 hours to decompose the macromolecular azo initiator. The decomposed product had the number-average molecular weight of 4,500. It was therefore found that the content of the urethane linkage in the polyurethane segment was 0.0011 mol/g and the polyurethane macromolecular azo initiator had on the average 6.2 diazo linkages in a molecule.

EXAMPLES 4 to 10

Example 1 was repeated except that a solvent, a azoalkanol compound, a polyol compound and a polyisocyanate compound shown in Table 1 were used and the reaction was performed under the conditions shown in Table 1. There resulted various final polyurethane macromolecular azo initiators.

The properties of the macromolecular azo initiators are shown in Table 1.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Reaction solvent | methyl ethyl ketone | 1,500 | 1,500 | 1,500 | 1,500 | 1,200 | | 1,000 | 1,500 | 1,500 | 1,500 |
| | n-methylpyrrolidone | | | | | 300 | 1,500 | 500 | | | |
| Azo alcohol | azobiscyanopropanol | 44 | 46 | 29 | 74 | 149 | 318 | 45 | 94 | 45 | 54 |
| Polyol | dipropylene glycol | 424 | 347 | | | | 137 | 405 | | | |
| | ethylene glycol | | | | | | | | | | |
| | neopentyl glycol | | | | | 268 | | | | | |
| | trimethylolpropane | | | | | 10 | | | | | |
| | "Polypropylene Glycol 400" | | | | 607 | | | | 573 | | |
| | polyester resin in Example 3 | | | 837 | | | | | | | |
| | "PLACCEL 208" (molecular*[1] weight = 820) | | | | | | | | | 760 | |
| | "Polytetramethylene Glycol 650" | | | | | | | | | | 715 |
| | 3-methyl-1,5-pentanediol | | 55 | | | | | | | | |
| Solvent | di-n-butyltin dilaurate | 0.1 | 0.2 | 0.1 | 0.2 | 0.2 | 0.2 | 0.2 | 0.2 | 0.2 | 0.2 |
| Diisocyanate | hexamethylene diisocyanate | 532 | 552 | 134 | 319 | 573 | 545 | 469 | | 195 | 231 |
| | tolylene diisocyanate | | | | | | | 81 | 333 | | |
| Properties | Nonvolatile content (%) | 40 | 40 | 40 | 40 | 40 | 40 | 40 | 40 | 40 | 40 |
| | Viscosity (Gardner) | $Z_1$ | Y-Z | W-X | V | X | $Z_8$ | Y | X-Y | V-W | X |
| | Number-average molecular weight | 22,500 | 18,500 | 28,000 | 16,000 | 9,800 | 35,000 | 14,500 | 20,000 | 19,000 | 17,500 |
| | Number of diazo groups in a molecule | 6.1 | 4.5 | 6.2 | 8.0 | 9.8 | 4.9 | 8.1 | 12.5 | 6.8 | 5.5 |
| | Number-average molecular weight of polyurethane moiety | 3,700 | 4,100 | 4,500 | 2,000 | 1,000 | 7,200 | 1,800 | 1,600 | 2,800 | 3,200 |
| | Amount of urethane linkage (mol/g) × $10^3$ | 6.4 | 6.7 | 1.1 | 3.0 | 6.3 | 8.6 | 6.0 | 2.9 | 1.7 | 2.1 |

*[1] Lactone diol made by Daisel Kagaku Kogyo K.K.

EXAMPLE 11

A four-necked flask fitted with a thermometer, a stirrer and a reflux condenser was charged with 600 parts of toluene and 100 parts of methyl ethyl ketone. The temperature was elevated to 80° C. A mixed solution comprising 400 parts of methyl methacrylate, 400 parts of ethyl acrylate and 500 parts of the polyurethane macromolecular azo initiator obtained in Example 1 was added dropwise over the course of 4 hours. After the above addition, the same temperature was kept for 10 hours and the polymerization reaction continued. In consequence, there resulted a solution of a polyurethane-acrylic resin block copolymer having the number-average molecular weight of 28,000, the nonvolatile content of 50% and the Gardner viscosity at 25° C. of $Z_3$.

EXAMPLES 12 to 20 and COMPARATIVE EXAMPLES 1 & 2

Example 11 was repeated except that a polymerisation solvent, an initiator and a polymerizable unsaturated bond-containing monomer shown in Table 2 were ised and the reaction was run under the polymerization conditions shown in Table 2. There resulted block copolymers and random copolymers.

The properties of said copolymers are shown in Table 2.

TABLE 2

| | Example | | | | | | | | | | Comparative Example | |
|---|---|---|---|---|---|---|---|---|---|---|---|---|
| | 11 | 12 | 13 | 14 | 15 | 16 | 17 | 18 | 19 | 20 | 1 | 2 |
| Reaction solvent | | | | | | | | | | | | |
| methyl ethyl ketone | 100 | | | | 100 | 300 | 300 | 300 | 200 | 300 | 200 | |
| n-butanol | | | | 100 | | | | | | | * | 300 |
| toluene | 600 | 550 | 250 | 600 | 600 | | | | | | 800 | |
| xylene | | | | | | 400 | 250 | 400 | 200 | 250 | | 700 |
| Monomer | | | | | | | | | | | | |
| styrene | | | | | | 100 | 100 | 100 | | 100 | | 150 |
| methyl methacrylate | 400 | 450 | 400 | 300 | 400 | 100 | 100 | 100 | 100 | 100 | 500 | 150 |
| butyl methacrylate | | | | | | 230 | 130 | 230 | 130 | 130 | | 330 |
| butyl acrylate | | 250 | | 300 | | | | | | | | |
| ethyl acrylate | 400 | | | | 400 | | | | | | 500 | |
| diethylhexyl acrylate | | | 100 | | | | | | | | | |
| dihydroxyethyl methacrylate | | | | | | 250 | 250 | 250 | 250 | 250 | | 250 |
| t-butyl methacrylate | | | | 200 | | | | | | | | |
| stearyl methacrylate | | | | | | 100 | 100 | 100 | 100 | 100 | | 100 |
| acrylic acid | | | | | | 20 | 20 | 20 | 20 | 20 | | 20 |
| Macromolecular azo initiator | | | | | | | | | | | | |
| macromolecular azo initiator in Example 1 | 500 | | | | | | | | | | | |
| macromolecular azo initiator in Example 2 | | 750 | | | | | | | | | | |
| macromolecular azo initiator in Example 3 | | | 1,250 | | | | | | | | | |
| macromolecular azo initiator in Example 4 | | | | 500 | | | | | | | | |
| macromolecular azo initiator in Example 5 | | | | | | 500 | | | | | | |
| macromolecular azo initiator in Example 6 | | | | | | | 750 | | | | | |
| macromolecular azo initiator in Example 7 | | | | | | | | 500 | | | | |
| macromolecular azo initiator in Example 8 | | | | | | | | | 1,000 | | | |
| macromolecular azo initiator in Example 9 | | | | | 500 | | | | | | | |
| macromolecular azo initiator in Example 10 | | | | | | | | | | 750 | | |
| Initiator | | | | | | | | | | | | |
| azobisisobutyronitrile | | | | | | | | | 1 | | 8 | 6 |
| t-butylperoxyoctoate | | | | | | | | | | 1 | | 2 |
| di-t-butylhydroperoxide | | | | | | | | | | | | |
| Polymerization temperature (°C.) | 80 | 80 | 80 | 80 | 80 | 90 | 90 | 90 | 90 | 90 | 80 | 90 |
| Properties | | | | | | | | | | | | |
| Nonvolatile content (%) | | | | | | 50 | | | | | | 50 |
| Viscosity (Gardner at 25° C.) | $Z_3$ | $Z_2$ | Y-Z | X | $Z_1$ | Z | W-X | T-U | U-V | W | $Z_2$ | X |
| Number-average molecular weight | 28,000 | 24,000 | 22,000 | 18,000 | 19,500 | 10,000 | 8,500 | 11,000 | 7,800 | 10,500 | 20,000 | 12,500 |
| Tg (°C.) of acrylic moiety | 27.2 | 25.8 | 49.4 | 23.0 | 27.3 | 32.8 | 34.7 | 32.8 | 26.0 | 34.7 | 27.2 | 37.2 |

APPLICATION EXAMPLE 1

One hundred parts of the polyurethane-acrylic resin block copolymer solution obtained in Example 11, 33.4 parts of "Tipaque CR-93" [a tradename for rutile titanium oxide made by Ishihara Sangyo Kaisha Ltd.] and 10 parts of toluene were kneaded by a ball mill for 1 hour to form a paint.

Subsequently, the paint was diluted with toluene such that a value measured by Ford cup #4 was 20 seconds, then coated on each of an ABS plate, a 6,6-nylon plate, a polished steel plate and a slate plate and dried at 25° C. for 2 weeks.

The properties were evaluated on the thus obtained coated films. The results are shown in Table 3.

APPLICATION EXAMPLES 2 to 5 and COMPARATIVE APPLICATION EXAMPLES 1 to 3

Application Example 1 was repeated except that the mixing ratios of the components and the reaction conditions shown in Table 3 were employed to form paints. The paints were then coated to obtain various coated films. The properties of the coated films are shown in Table 3.

"Super Backamin L-117-60" (a tradename for n-butyletherified melamine resin made by Dainippon Ink & Chemicals, Inc., a nonvolatile content ≈ 60%) was added thereto to form a paint.

Subsequently, this paint was diluted such that a value measured by Ford cup #4 was 25 seconds, coated on each of an ABS plate, a 6,6-nylon plate, a polished steel plate and an urethane plate with an air spray of 3 atm, and baked at 150° C. for 30 minutes. There were obtained cured coated films.

The properties were evaluated on the thus obtained coated films. The results are shown in Table 4.

APPLICATION EXAMPLES 7 to 10 and COMPARATIVE APPLICATION EXAMPLES 4 to 6

Application Example 6 was repeated except that the

TABLE 3

| | | Application Example | | | | | Comparative Application Example 1 |
|---|---|---|---|---|---|---|---|
| | | 1 | 2 | 3 | 4 | 5 | |
| Paint composition (parts) | Resin in Example 11 | 100 | | | | | |
| | Resin in Example 12 | | 100 | | | | |
| | Resin in Example 13 | | | 100 | | | |
| | Resin in Example 14 | | | | 100 | | |
| | Resin in Example 15 | | | | | 100 | |
| | Resin in Comparative Example 1 | | | | | | 100 |
| | "Tipaque CR 93" | | | 33.4 | | | 33.4 |
| Curing conditions | | room temperature, 7 days | | | | | |
| Adaptability as a paint | Pigment dispersibility | | | ⊙ | | | Δ |
| Properties of coated film | Elongation (%) | 350 | 400 | 310 | 430 | 480 | 250 |
| | Tensile strength (kg/cm²) | 250 | 310 | 290 | 230 | 200 | 180 |
| | Pencil hardness | HB-F | HB-F | HB-F | B-HB | B-HB | B-HB |
| | Stain resistance (initial) | ⊙ | ⊙ | ⊙ | ○ | ○ | ⊙ |
| | Stain resistance (after weatherability test) | ⊙ | ⊙ | ⊙ | ○~Δ | ○~Δ | Δ |
| | Low-temperature flexibility | | | ⊙ | | | X |
| | Adhesion (ABS plate) | | | 100/100 | | | 0/100 |
| | Adhesion (nylon plate) | | | 100/100 | | | 0/100 |
| | Adhesion (steel plate) | | | 100/100 | | | 80/100 |
| | Adhesion (slate plate) | | | 100/100 | | | 80/100 |
| | Weatherability (gloss retention) | ⊙ | ⊙ | ⊙ | ⊙ | ⊙ | ⊙ |
| | Gloss (60° gloss) | 88 | 92 | 85 | 80 | 81 | 90 |
| | Water resistance (dipped in water for 48 hours) | ⊙ | ⊙ | ⊙ | ○~⊙ | ⊙ | ⊙ |
| | Solvent resistance (dipped in xylene for 48 hours) | | | ⊙ | | | Δ~X |
| | Scuff resistance (observed with an unaided eye) | ⊙ | ⊙ | ⊙ | ○~⊙ | ○~⊙ | X |

⊙: excellent, ○: good, Δ: fair, and X: poor

APPLICATION EXAMPLE 6

One hundred parts of the block copolymer resin solution obtained in Example 18, 33.4 part of "Tipaque CR-93" and 10 parts of methyl isobutyl ketone were kneaded by a sand mill for 1 hour, and 35.7 parts of mixing ratios of the components and the reaction conditions shown in Table 4 were employed to form paints. Said paints were coated to obtain coated films.

The properties were evaluated on these coated films. The results are shown in Table 4.

TABLE 4

| | | Application Example | | | | | Comparative Application Example 2 |
|---|---|---|---|---|---|---|---|
| | | 6 | 7 | 8 | 9 | 10 | |
| Paint composition (parts) | Resin in Example 16 | 100 | | | | | |
| | Resin in Example 17 | | 100 | | | | |
| | Resin in Example 18 | | | 100 | | | |
| | Resin in Example 19 | | | | 100 | | |
| | Resin in Example 20 | | | | | 100 | |
| | Resin in Comparative Example 2 | | | | | | 100 |
| | "Super Beckamin L-117-60" | 35.7 | | 35.7 | | | |
| | "BURNOCK DN-950"*1 | | 32.1 | | 32.1 | | |
| | "BURNOCK D-550"*2 | | | | | 62.0 | 62.0 |
| | "Tipaque CR 93" | | | 33.4 | | | 33.4 |
| Curing conditions | | 150° C., 30 mins. | 80° C., 3 hrs. | 150° C., 30 mins | 80° C., 3 hrs. | 150° C., 30 mins. | 150° C., 30 mins. |

TABLE 4-continued

|  |  | Application Example | | | | | Comparative Application Example 2 |
|---|---|---|---|---|---|---|---|
|  |  | 6 | 7 | 8 | 9 | 10 |  |
| Adaptability as a paint | Pigment dispersibility |  |  | ◎ |  |  | Δ |
| Properties of coated film | Elongation (%) | 28 | 400 | 35 | 480 | 520 | 160 |
|  | Tensile strength (kg/cm²) | 210 | 240 | 300 | 190 | 150 | 500 |
|  | Pencil hardness | H | F-H | H | H | F-H | F-H |
|  | Stain resistance (initial) | ◎ | ○ | ◎ | ○~◎ | ○~◎ | ○ |
|  | Stain resistance (after weatherability test) | ◎ | ○ | ◎ |  |  | X |
|  | Low-temperature flexibility |  |  | ◎ |  |  | X |
|  | Adhesion (ABS plate) | — | 100/100 | — | 100/100 | — | — |
|  | Adhesion (nylon plate) | — | 100/100 | — | 100/100 | — | — |
|  | Adhesion (steel plate) | 100/100 | 100/100 | 100/100 | 100/100 | 100/100 | 80/100 |
|  | Adhesion (urethane plate) | — | 100/100 | — | — | 100/100 | — |
|  | Weatherability (gloss retention) |  |  | ◎ |  |  | ○ |
|  | Weatherability (60° gloss) | 90 | 91 | 88 | 90 | 92 | 92 |
|  | Water resistance (dipped in water for 48 hours) |  |  | ○ |  |  | ○ |
|  | Solvent resistance (dipped in xylene for 48 hours) |  |  | ○ |  |  | ○ |
|  | Scuff resistance (observed with an unaided eye) | ○ | ○~◎ | ○ | ○~◎ | ○~◎ | X |

*¹Non-yellowing polyisocyanate resin made by Dainippon Ink and Chemicals, Inc.
*²Block isocyanate resin made by Dainippon Ink and Chemicals, Inc.
◎: excellent; ○: good; Δ: fair; and X: poor The properties of the coated films shown in Tables 3 and 4 were evaluated as follows.

Elongation:
Using "Tensilon" (a tradename for a product made by Toyo Baldwin K.K.), elongation was measured at room temperature and a pulling rate of 20 mm/min.

Tensile strength:
Same as above.

Pencil hardness:
It was shown by such hardness that the coated film was flawed by "MITSUBISHI UNI" (a tradename for a pencil made by Mitsubishi Enpitsu K.K.).

Stain resistance:
A test plate was contaminated with a mixture of mud, carbon black, mineral oil and clay, left to stand for 24 hours, washed with water, and wiped with a dry cloth. The state of remaining stain was observed with an unaided eye and indicated as "initial stain resistance". Moreover, the test plate was put in "SUNSHINE WEATHEROMETER" (a tradename for a machine manufactured by Suga Shikenki K.K.) for 600 hours and forcively exposed thereto. The resulting test plate was also subjected to the aforesaid stain treatment repeatedly for visual observation of the state of remaining stain. This was indicated as "stain resistance after weatherability test".

Low-temperature flexibility:
Each of the paints was coated on a tinplate. The coated film was cooled to 0° C., and then subjected to a flexibility test by a 1 inch mandrel. On that occasion, when the coated surface was not cracked at all, this state was rated as "good", and when the coated surface was cracked, this state was rated as "cracked".

Adhesion:
It was measured by a method in which crosscuts (10×10) were applied to the coated surface of the test plate, and then delaminated by a cellophane tape.

Weatherability:
Using "Q-UV" (a tradename for a product made by Q-Panel, U.S.A.), an accelerated weathering test was run for 800 hours. Weatherability was indicated by retention (%) of gloss after this test.

Pigment dispersibility:
Each of the copolymer solutions was mixed with "MA-100" (a tradename for carbon black made by Mitsubishi Chemical Industries, Ltd.) such that PWC became 5%, and the mixture was kneaded with a sand mill. A degree of agglomeration of carbon black (a state given when a sample diluted 10 times with methyl ethyl ketone flowed on a white paper and was coated thereon) was observed with an unaided eye.

Gloss:
Gloss given by reflection of light on a 60° mirror surface was measured by a Murakami-type glossmeter.

Scuff resistance:
The coated film was rubbed 50 times with a felt containing a polishing powder under a load of 700 g, and the state of the rubbed coated film was then observed with an unaided eye.

From Tables 3 and 4, it follows that the resins for paints in this invention are excellent in pigment dispersibility, that when used as a lacquer type, they are excellent in adhesion and stain resistance, and that when used as a baking type, they are good at hardness and high in tensile strength but good at elongation. Thus, the resins for paints in this invention are found to have the well-balanced properties as a whole.

What is claimed is:

1. A macromolecular azo compound obtained by the reaction of a compound having at least 1 diazo linkage and at least 2 hydroxyl groups in a molecule, a compound having at least 2 isocyanate groups in a molecule and a compound having at least 2 hydropxyl groups in a molecule.

2. A process for producing a macromolecular azo compound, which comprises reacting a compound having at least 1 diazo linkage and at least 2 hydroxyl groups in a molecule, a compound having at least 2 isocyanate groups in a molecule and a compound having at least 2 hydroxyl groups in a molecule.

3. The macromolecular azo compound of claim 1 having in a molecule at least one structural unit represented by formula

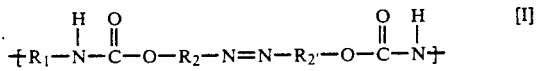

wherein $R_1$ denotes an alkylene group or an alkylene group containing a benzene ring or a cyclohexane ring, $R_2$ and $R_{2'}$ may be the same or different and each denotes an alkylene group, a cyano group-containing alkylene group, an amide linkage-containing alkylene group or an alkylene group containing an amide linkage and a hydroxyl group, and at least one structural unit represented by formula

wherein $-O-A-O-$ denotes a polyurethane polyol residue in which A denotes a polyurethane chain, and a concentration of the urethane linkage in the polyurethane chain A is 0.001 to 0.009 mol/g.

4. The process of claim 2 for producing a macromolecular azo compound having in a molecule at least one structural unit represented by formula

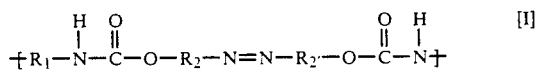

wherein $R_1$ denotes an alkylene group or an alkylene group containing a benzene ring or a cyclohexane ring, $R_2$ and $R_{2'}$ may be the same or different and each denotes an alkylene group, a cyano group-containing alkylene group, an amide linkage-containing alkylene group or an alkylene group containing an amide linkage and a hydroxyl group, and at least one structural unit represented by formula

wherein $-O-A-O-$ denotes a polyurethane polyol residue in which A denotes a polyurethane chain, and a concentration of the urethane linkage in the polyurethane chain A is 0.001 to 0.009 mol/g.

5. A resin obtained by polymerizing a polymerizable unsaturated bond-containing monomer in the presence of a macromolecular azo compound formed by the reaction of a compound having at least 1 diazo linkage and at least 2 hydroxyl groups in a molecule, a compound having at least 2 isocyanate groups in a molecule and a compound having at least 2 hydroxyl groups in a molecule.

6. The resin of claim 5 obtained by polymerizing the polymerizable unsaturated bond-containing monomer in the presence of a macromolecular azo compound having in a molecule at least one structural unit represented by formula

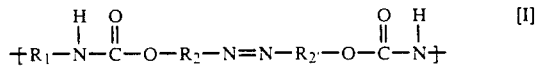

wherein $R_1$ denotes an alkylene group or an alkylene group containing a benzene ring or a cyclohexane ring, $R_2$ and $R_{2'}$ may be the same or different and each denotes an alkylene group, a cyano group-containing alkylene group, an amide linkage-containing alkylene group or an alkylene group containing an amide linkage and a hydroxyl group, and at least one structural unit represented by formula

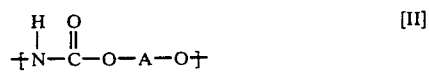

wherein $-O-A-O-$ denotes a polyurethane polyol residue in which A denotes a polyurethane chain, and a concentration of the urethane linkage in the polyurethane chain A is 0.001 to 0.009 mol/g.

7. The resin of claim 5 obtained by polymerizing 98 to 5% by weight of the polymerizable unsaturated linkage-containing monomer in the presence of 2 to 95% by weight of a compound having a number-average molecular weight of 1,500 to 50,000 and having in a molecule at least one structural unit represented by formula

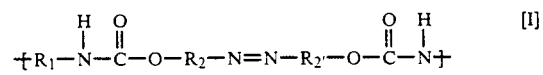

wherein $R_1$ denotes an alkylene group or an alkylene group containing a benzene ring or a cyclohexane ring, $R_2$ and $R_{2'}$ may be the same or different and each denotes an alkylene group, a cyano group-containing alkylene group, an amide linkage-containing alkylene group or an alkylene group containing an amide linkage and a hydroxyl group, and at least one structural unit represented by formula

wherein $-O-A-O-$ denotes a polyurethane polyol residue in which A denotes a polyurethane chain, and a concentration of the urethane linkage in the polyurethane chain A is 0.001 to 0.009 mol/g.

8. The resin of claim 6 or 7 wherein the number-average molecular weight of the structural unit represented by formula

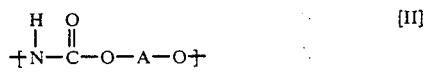

wherein $-O-A-O-$ denotes a polyurethane polyol residue in which A denotes a polyurethane chain, and a concentration of the urethane linkage in the polyurethane chain A is 0.001 to 0.009 mol/g.

9. The resin of any one of claims 5 to 8 wherein the number-average molecular weight of the resin itself is 10,000 to 80,000.

10. The macromolecular azo compound of claim 1 wherein the compound having at least 1 diazo linkage and at least 2 hydroxyl groups in a molecule is an azoamide polyol.

11. The process of claim 2 wherein the compound having at least 1 diazo linkage and at least 2 hydroxyl groups in a molecule is an azoamide polyol.

12. The resin of claim 5 wherein the compound having at least 1 diazo linkage and at least 2 hydroxyl groups in a molecule is an azoamide polyol.

13. The macromolecular azo compound of claim 1 wherein the compound having at least 1 diazo linkage and at least 2 hydroxyl groups in a molecule is an azobisalkanol.

14. The process of claim 2 wherein the compound having at least 1 diazo linkage and at least 2 hydroxyl groups in a molecule is an azobisalkanol.

15. The resin of claim 5 wherein the compound having at least 1 diazo linkage and at least 2 hydroxyl groups in a molecule is an azobisalkanol.

* * * * *